United States Patent [19]

Highland

[11] Patent Number: 4,924,408

[45] Date of Patent: May 8, 1990

[54] TECHNIQUE FOR COMPILATION OF KNOWLEDGE BASES

[75] Inventor: Frederic D. Highland, New Midway, Md.

[73] Assignee: International Business Machines Corporation, Armonk, N.Y.

[21] Appl. No.: 234,268

[22] Filed: Aug. 19, 1988

[51] Int. Cl.5 .............................................. G06F 15/18

[52] U.S. Cl. .................................... 364/513; 364/200; 364/300

[58] Field of Search ................ 364/513, 300, 200, 900

[56] References Cited

U.S. PATENT DOCUMENTS

| | | | |
|---|---|---|---|
| 4,591,983 | 5/1986 | Bennett et al. | 364/513 |
| 4,648,044 | 3/1987 | Hardy et al. | 364/513 |
| 4,658,370 | 4/1987 | Erman et al. | 364/513 |
| 4,713,775 | 12/1987 | Scott et al. | 364/513 |
| 4,783,752 | 11/1988 | Kaplan et al. | 364/513 |

OTHER PUBLICATIONS

Artificial Intelligence; pp. 17–37; Rete: A Fast Algorithm for the Many Pattern/Many Object Pattern Match Problem; Forgy; 1982.

Rule-Based Programming in OPS83; Neiman et al.; AI Expert; pp. 54–65; Premier, 1986.

Economy in Expert System Construct: The AEGIS Combat System Maintenance Advisor; Drastal et al.; SPIE Applications of Artificial Intelligence Conference; Apr. 1, 1986.

LISP; Second Edition; Winston et al.; Addison-Wesley Pub. Co.; pp. 269–284.

YES/L1: A Language for Implementing Real-Time Expert Systems; Milliken et al.; pp. 1–6; IBM Thomas J. Watson Research Center.

*Primary Examiner*—Allen MacDonald

*Attorney, Agent, or Firm*—Jesse L. Abzug

[57] ABSTRACT

A method is disclosed for converting both a knowledge base and an inferencing technique into compilable program code forming a knowledge based system. The method is based on determining what actions an interpretitive inference engine would take with the specific knowledge base and generating only the program code needed to perform these actions. These method eliminates the overhead of interpreting a representation of the knowledge base and significantly improves performance of the system. The method is applicable to both forward and backward chaining reasoning strategies and does not modify or restrict the functional capabilities of the knowledge based system.

13 Claims, 2 Drawing Sheets

RULES
IF Q OR Z>122 THEN ACTION 1
IF X=1 AND Y<10 THEN Q

INTERNAL RULE TREE
GOAL
ACTION 1
OR
AND
Z>122
X=1
Y<10

FIG. 1a
RULES
IF Q OR Z>122 THEN ACTION 1
IF X=1 AND Y<10 THEN Q
FIG. 1b
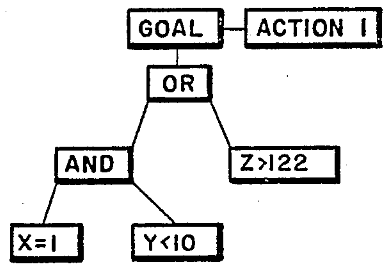
FIG. 2a
KNOWLEDGE BASE
IF A>10 AND B<0
THEN DISPLAY A
FIG. 2b
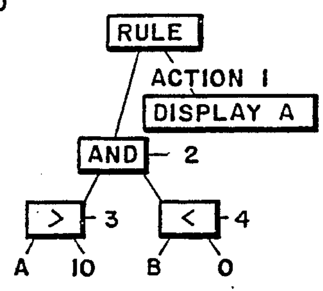
FIG. 2c
GENERATED CODE
```
R1: PROC (N)
    WHILE (N<>0)
    CASE (N)

  1: DISPLAY A
  2: IF LEFT INPUT TRUE
    AND RIGHT INPUT TRUE
     THEN N=1
     ELSE
     N=0
  3: IF A>10 THEN
     N=2
     ELSE
     N=0
  4: IF B<0 THEN
     N=2
     ELSE
     N=0
   END

  END
  A- DIST: PROC
         CALL R1 (3)
          "    "
         END
  B- DIST: PROC
         CALL R1(4)
          "    "
         END
```

TECHNIQUE FOR COMPILATION OF KNOWLEDGE BASES

BACKGROUND OF THE INVENTION

Field of the Invention: The present invention relates generally to the field of knowledge based systems; that is, computer systems that emulate reasoning tasks by using a so-called "inference engine" to interpret encoded knowledge of human experts stored in a "knowledge base". If the domain of the knowledge base, or scope of the problem, is sufficiently narrow and a sufficiently large body of the knowledge is properly coded in the knowledge base, then the knowledge based system can achieve performance that matches or exceeds the ability of a human expert. In such a case, the knowledge based system is called an "expert system."

More specifically, the present invention relates to a method of converting both a knowledge base and an "inference engine" into program source code which may be compiled into object code for execution by a computer, thereby increasing the execution speed of the expert system.

Introduction: While knowledge based system technologies have shown promise in many useful applications, their use in some areas has been impaired by the limited performance of the presently known implementations. This is particularly true in real-time monitoring and control applications which must reason large amounts of data in a very short period of time and in embedded applications in which the knowledge based system must share the resources of the computer with a number of other applications.

While the performance of current knowledge based systems may be improved through the development of special hardware to support the reasoning process, a major performance limitation for knowledge based systems on conventional hardware is due to the inherent interpretive nature of their implementations. Even when an "inference engine" is implemented in a compiled language, the general purpose design the inference engine requires the interpretation of data structures representing the knowledge base. This process of interpretation is inefficient in comparison to compiled implementations. Compilation of the knowledge bases can be performed by restricting the inferencing techniques available to decision trees or other single paradigm reasoning strategies; however, this restriction limits the knowledge engineer's ability to represent and solve some classes of problems.

Interpretive Implementations of Reasoning: Most knowledge based systems represent knowledge internally as collections of data structures. The data structures are composed of nodes and links between the nodes. The nodes represent the rules and the tests within the rules. Included in the nodes are: how facts are tested and the results of these tests, how to acquire the facts, the operations performed on the facts and the means of processing the results of the tests. The links represent the way in which facts and the results of tests are combined into rule conditions, the references made to these tests and rule conditions by other rules in the knowledge base, and the actions to be performed when a rule is "true". The nodes are usually organized into trees or networks which are augmented with lists of references or current data values. These networks are traversed by the inference engine to implement the reasoning process. At each node, the inference engine must examine the contents of the node to determine what data is involved and what tests need to be performed on that data (test evaluation), which nodes to process next based on the results of these tests (test result propagation), and what actions to perform when a rule becomes true (performance of rule actions). Based on the results of this process the inference engine must then follow one or more links to the other nodes. This is the essence of the interpretive process.

As an example of this, consider a simple backward chaining system which organizes its rules as a set of goal trees, each containing one or more rules that provide conditions and fact values concluding in a single goal. A particular set of such rules, and a goal tree that would result from them, is represented in FIG. 1. The reasoning process for such a system would begin by selecting a goal and then "depth-first" traversing the respective goal tree to locate a fact that is not currently known. The value for the fact is then acquired by interpreting information in the fact node that indicates how to obtain the value. Next, test evaluation occurs by interpreting information in the test nodes that reference that fact. The results of these tests are then propagated up the goal tree by reversing the traversal process and interpreting each node to determine how the results of previous nodes are to be combined and passed to the next node in the tree. In addition to the interpretation that must be performed for test evaluation and result propagation, the tree traversal process must also be interpretive because connections are only known to the nodes which represent the trees. This form of backward chaining reasoning mechanism is similar to that of EMYCIN (Van Melle et al, "The EMYCIN Manual", *Heuristic Programming Project Report HPP*-81-16, Stanford University, 1981); PIE (Burns et al., "The Portable Inference Engine: Fitting Significant Expertise into Small Systems", *IBM Systems Journal,* Vol. 25, No. 2, 1986), and example systems proposed by Winston and Horn (*LISP,* 2nd Ed., Chapter 18, "Expert Problem Solving using Rules and Streams," Addison Wesley, Reading, Mass., 1984).

Other known knowledge based systems are disclosed in the U.S. Pat. Nos. 4,591,983; 4,648,044 and 4,713,775, all assigned to Teknowledge Inc., Palo Alto. Calif.

Forward chaining reasoning algorithms differ from backward chaining in that they work forward from facts to goals. The tree or network form of knowledge representation may still be used but the depth-first traversal to find a fact to evaluate is not performed. Instead, the system must search for facts that match rule conditions. Typically, this involves propagation of data values to the rules that use that data and evaluation of rule tests based on that data. This again involves interpretation of the test nodes to evaluate these tests with respect to a set of facts. After a test is evaluated, the results are propagated up the goal trees by interpreting the nodes at each step to determine how the results of previous nodes are to be processed, combined and passed to the next node in the network. This form of forward chaining reasoning mechanism is similar to that of example systems proposed by Winston and Horn (*LISP.* 2nd Ed., Chapter 18, Addison Wesley, Reading, Mass., 1984) and has been highly optimized in OPS5 (Forgy, "Rete: A Fast Algorithm for the Many Pattern-/Many Object Match Problem", *Artificial Intelligence,* Vol. 19, 1982).

The interpretive traversal of these trees or networks and the determination of the steps required to process each node degrades the performance of the reasoning process. At each node, the reasoning system must determine which of a possible set of steps are required and then perform those steps using information available at the node. Once the steps required to process a node have been performed, a determination of which node(s) to process next must be made. The performance of knowledge based systems could be greatly improved if the interpretation process were eliminated and the equivalent steps were performed by concise, compiled program code.

SUMMARY OF THE INVENTION

It is a principal objective of the present invention to provide a technique or method that can be used to convert knowledge bases directly into compilable, high level language, program code providing high performance using existing and proven reasoning algorithms.

It is a further objective of the present invention to provide a method for the represention of knowledge bases in a program form and the generation of this form from the rules of a knowledge base.

These objects, as well as other objects which will become apparent from the discussion that follows, are achieved, according to the present invention, by a method comprising the following steps:

(a) Partitioning the network of nodes, and links between such nodes, into a plurality of rule trees or "sub-networks".

(b) Labelling each node within each respective sub-network with a unique identifier or index for subsequent reference.

(c) Generating a segment of compilable, procedural, program code which is equivalent to each respective sub-network when combined with the inferencing technique. This program code will hereinafter be called the "inferencing code". The identifiers which were established in step (b) are used to locate the respective code for each node within each respective sub-network. This inferencing code comprises a node sub-segment that implements the function of each node in each respective sub-network based on the rules specified in the knowledge base, and it conditionally invokes other sub-segments using the identifiers. The inferencing code also comprises a control sub-segment which provides access to each node sub-segment using the identifiers and provides for repeated execution of each node sub-segment as necessary in order to effect the traversal of the network.

(d) Generating for each data item a segment of compilable, procedural, program code for the distribution of such data item. This code, which will be hereinafter called the "distribution code", invokes the appropriate inferencing code by means of the identifiers when such data item is modified during execution of the knowledge based system.

Thus the basic approach to rule compilation, according to the present invention, is first to determine the steps that would be taken by an interpretive inference engine during the reasoning process then and to generate only the program code needed for these steps. Through analysis of the knowledge base, the set of possible steps for any given component of the knowledge base can be significantly reduced, often to a single step. This can then be converted to concise, efficient, procedural, program code to implement the reasoning process. Similarly, the steps that must follow this processing can also be identified so that additional program code can be generated. Using this approach, any interpretive inferencing program can be converted to a compiled system which avoids the interpretive steps.

As may be seen, the method according to the present invention thus addresses the compilation of the test evaluation, the test result propagation, and the performance of rule actions. These activities are common to forward chaining, backward chaining, as well as to mixed chaining (combined forward and backward chaining) reasoning processes. Since the evaluation and propagation steps are the most frequently used operations in reasoning, their compilation will produce the most benefit in overall performance. Methods to improve the performance of the selection of facts to evaluate for backward chaining reasoning are not specifically addressed hereinbelow, as they may be extrapolated from the forward reasoning process presented here.

In order to perform rule compilation, the rules must be converted into a network representation with nodes for each rule component and links indicating the relationships of rule components to other rule components and facts. This is the same network that is used by the interpretive inference engine during execution of the knowledge base as in FIG. 1. In addition, a mechanism must be developed to compile the traversal of the network for the propagation of results in order to preserve the dynamic nature of the knowledge based system.

The compilation technique according to the invention first partitions the network of rules into a set of rule tree sub-networks. Although the sub-networks are considered to be trees, they need not be proper trees because they may contain references to other sub-networks within the tree. The criteria used for this partitioning is arbitrary. The partitioning can be performed on a rule basis or by groups of rules that use a common set of data. To maximize performance, the criteria should be based on minimizing references to other sub-networks outside of each respective individual sub-network in order to reduce procedure call overhead.

Next, the nodes of each rule tree (sub-network) are represented as parts of a case structure within a "while loop" controlled by a case index. Each part of the case structure consists of a segment of program code that performs the function of a node in the rule network generated from the knowledge base. Each of the program code segments conditionally passes control to its parent node in the tree through manipulation of the case index. Code segments may also pass other information, such as fact bindings or certainty factors, to their parents. The use of a tree structure guarantees that only one parent exists for each node in the rule tree, eliminating the need for multiway branching and a stack mechanism to maintain the branch information. Parents outside of the rule tree can be accessed by procedural invocation of the node in the outside rule tree. This eliminates the direct need for a stack to hold pending values as it is implicit in the procedural invocation mechanism. A stack may be required in situations where multiple data values must be passed to the parents individually. This need may also be eliminated by passing the data values as a list of values rather than as separate items. The use of the "while loop" permits propagation (execution of a series of code segments) to continue as far as possible on each invocation of the control structure. It also allows any node in the rule tree to be invoked on demand for additional flexibility in node evaluation (for example, when one part of an element in a structure of fact changes).

The final stage of the control structure identifies a rule as "concluded". This can consist of placing an entry in a conflict set to be selected for activation by a conflict resolution mechanism or by direct execution of the rule's action.

Finally, procedural program code must be generated to activate the rule trees based on changes to data items in the knowledge base. This program code is termed "distribution code" herein because its purpose is to "distribute" the modifications to the respective data items during execution of the knowledge based system. Through analysis of the knowledge base, a list of rule trees and the nodes within those trees can be developed for each data item. From these lists, the distribution code can be generated to invoke the appropriate node of each rule tree when the data item is changed. The distribution code can be structured to invoke all nodes referring to a data item or only selected nodes.

In some systems the identification of a data item to distribute is performed as part of a test on a generic data item or class that is implemented as an initial (implicit) test in the rule trees. (see Forgy, "Rete: A Fast Algorithm for the Many Pattern/many Object Match Problem", *Artificial Intelligence,* Vol. 19, 1982) Since the exact use of each data item by rule tree can be predetermined through analysis of references in the rules, it is more efficient to directly invoke rule tree structures, thus eliminating the need for this test.

Using this implementation, the process of evaluation and propagation is started by the distribution code when a data item is updated. The distribution code passes an index value for the node to be evaluated to the rule tree case structure. This causes selection and evaluation of the desired node. Depending upon the results of the evaluation, the index is reset to either the index value of the parent node to be evaluated or to the exit index. The process continues until the rule is concluded or all sub-conclusions that can be derived from the currently available information are exhausted. References to a rule from other rule trees are implemented as invocations of the other rule tree case structures that pass the appropriate index for the referenced entry.

BRIEF DESCRIPTION OF THE DRAWINGS

FIG. 1 (comprised of FIG. 1*a* and FIG. 1*b*) illustrates how rules of a knowledge base (FIG. 1*a*) can be represented by a "rule tree" network (FIG. 1*b*).

FIG. 2 (comprised of FIG. 2*a*, FIG. 2*b* and FIG. 2*c*) illustrates how rules of a knowledge base (FIG. 2*a*) can be translated into a rule tree network (FIG. 2*b*), and how this rule tree network can be converted into compilable, procedural, program code according to the present invention (FIG. 2*c*).

DESCRIPTION OF THE PREFERRED EMBODIMENT

A preferred embodiment of the present invention will now be described with reference to FIG. 2 of the drawings which illustrates a simplified example of the inventive method.

FIG. 2*a* shows a rule that forms a simple knowledge base. FIG. 2*b* shows the internally generated rule tree resulting from this rule. FIG. 2*c* shows a simplified version of the program code resulting from this knowledge base to perform the distribution and propagation functions. Whenever the values of A or B are changed, the A-DIST: or B-DIST: procedures invoke the rule tree procedure RULE1 (i.e. "R1") with the appropriate index value to cause evaluation of the tests. The results of the tests are then propagated up the tree as far as possible. Details of the code to evaluate the AND condition are omitted from this example. This function must determine whether all of the required terms are evaluated. The result is used to either pass control to the next node-segment or set the index to 0 to terminate processing until all terms have been evaluated. There are many possible ways to perform this function such as direct testing of status indicators, searching a list of indicators, or using evaluation count mechanisms. Program code to manage and pass data values to parent nodes has also been omitted from this example for simplicity.

The conversion of the rules in the knowledge base into compilable, procedural program code according to the present invention is therefore accomplished by the following steps:

Step 0: Put the knowledge base in a network form as is used for interpretive inferencing. This step is performed in most current knowledge based system implementations. The network should represent rule components (tests, logical operators, actions, facts items) as nodes and the relationship of the rule components to each other and to facts in the knowledge base as links.

Step 1: Convert the knowledge base into a forest of rule trees. This requires the application of some criteria for partitioning the rule network into rule tree sub-networks which have a single root. A minimum number of references out of each sub-network is desirable for performance reasons. The most convenient criteria for the partitioning in most systems is that each rule or end of an inference chain should form a rule tree with the rule's action becoming the root.

Step 2: Depth-first traverse each resulting rule tree (sub-network) starting at the root and label each node sequentially with an identifier or index starting with "1". This step will uniquely identify each node within a rule tree and provide the index value for the case structure. Nodes of rules that are not in the current rule tree are not numbered.

Step 3: Depth-first traverse each rule tree and generate a procedure for the rule consisting of a prologue (procedure header, initialization, while and case statements), a case part for each node that implements the function of that node based on the rules specified in the knowledge base, conditional code to reset the index to the next node to be evaluated under the proper conditions, and an epilogue. Case index values are obtained from the numbering of Step 2. Nodes that are referenced by other rule trees should contain calls to the referencing rule procedures passing the index value for the reference point and any associated fact bindings or certainties. The index value is obtained by using the link to the reference point. Rule actions that update fact values should also propagate those values to referencing rules through calls to the appropriate distribution procedures.

Step 4: For each data item in the knowledge base, generate a distribution procedure consisting of a prologue, a code to call each rule procedure which references the data item, and an epilogue. The call will pass the index for the test node to be executed in the rule procedure.

This method according to the present invention generates a set of rule processing and data distribution procedures that are specific to the knowledge base. The method combines the specific rules of the knowledge base with the inferencing logic to produce a unique code module. Hence, the inference engine is no longer physically separated from the rules as is the case with prior known knowledge based systems; instead it has been optimally merged with the rule code. Despite the lack of a physically distinct inference engine, the functionality of the conventional approach (separate inference engine and knowledge base) has been preserved since the resulting modules take the same actions that the inference engine would have taken.

The processing performance gains obtained by the compilation technique according to the present invention depend heavily on the complexity of rule language, the amount of interpretation done at execution time by the inference engine, and the underlying algorithms used. The performance gains occur at the points at which selections must be made between alternative paths or processing steps. Knowledge representation languages which offer a richer set of features will encounter more alternative paths during processing and can be expected to experience greater performance gains.

The implementation of rules and the inference engine as procedural, program code provides additional efficiencies of implementation beyond the removal of the interpretive overhead. Facts and knowledge base control blocks can be represented as program variables and referenced directly rather than using indirection, linked lists or other dynamic structures that require search or more complicated traversal. Similarly, expressions used in rule condition tests and action statements can be implemented efficiently in the code rather than as complex interpretive structures. Interpretive inference engines cannot take advantage of these implementations because they must be generalized for all possible knowledge bases and structures.

Additionally, the conversion of knowledge bases into program code improves the embeddability of the resulting system. The compiled knowledge base is compatible with any environment that the language that is generated is compatible with.

The program code generated by the compilation technique according to the present invention will potentially require more storage than the corresponding data structures used by interpretive techniques. This is because the generalized logic used by the interpretive approach is customized and repeated in each node. This type of tradeoff (more storage for lower processing requirements) is typical of processing optimization techniques. The actual difference in storage size will again depend on the complexity and features of the rule language. The amount of storage required will generally be directly proportional to the amount of storage required by the data structure form of the knowledge base; combinatorial explosions resulting from rule and data interactions will not occur. This is because the code is generated from an internal representation of the knowledge base that is similar to that used by an interpretive form of the same knowledge base.

The size of the generated code can be reduced through the proper use of utility procedures. The compilation of the knowledge base may still result in some commonly used sequences of code. Any code sequence that does not incorporate code derived from knowledge base specifications can be considered for implementation as a utility procedure.

It should also be noted that the program code generated using the compilation technique according to the present invention includes the logic for the inference engine whereas the comparable data structures used by the conventional approach do not. To obtain truly comparable numbers, the size of the inference engine software in conventional techniques must be considered along with the size of the data structures representing the knowledge base.

An alternative approach to knowledge base compilation is to represent the rule network as a set of decision trees which can then be represented by a series of nested IF statements. This approach has been used in a number of systems such as compiled versions of EMYCIN (Van Melle et al., "The EMYCIN Manual"; *Heuristic Programming Project Report HPP*-81-16, 1981). However, this approach effectively fixes the order of evaluation of the parameters involved (based on their values) and does not provide access to individual nodes on demand. Since access to individual nodes is not provided, this approach does not support techniques such as dynamic rule ordering based on confidence or forward chaining reasoning. In addition, this approach is specific to the inferencing provided by these systems and may not be applicable to other inferencing paradigms.

Another approach is to compile the conditions and actions of rules into program code but retain the inference network as an interpreted data structure. This technique has been used by KnowledgeTool (a trademark of IBM Corp.) and ETC (Drastal et al, "Economy in Expert System Construction: The AEGIS Combat System Maintenance Advisor", *SPIE Applications of Artificial Intelligence Conference,* 1986). This approach only improves the performance of condition evaluation and action execution and does not address the issue of rule result distribution which is central to the inferencing process.

The compilation technique according to the present invention has certain similarities to an approach to the compilation of RETE networks suggested by Forgy, "Rete: A Fast Algorithm for the Many Pattern/Many Object Match Problem," *Artificial Intelligence,* Vol. 19, 1982. However, Forgy's approach is specific to RETE networks and involves the use of branching (GOTOs) and a stack to retain alternatives. The use of branching and the lack of a distribution procedure could require large code segments to implement the entire RETE network which could exceed the limit imposed by language compilers. The technique according to the present invention produces structured code without GOTOs and does not require an explicit stack. The production of structured code allows rules to be implemented in smaller modules to avoid the restrictions of high level language compilers and to provide possibilities for segmentation of knowledge bases in storage for operations on small systems.

Conclusion: A method for the compilation of knowledge bases has been presented. This method provides a performance improvement over the conventional interpretive approach that varies depending on the complexity and features of the rule language. This method is superior to the decision tree generation approach because it allows direct access to each node in the resulting rule networks supporting forward chaining reasoning and allows the use of techniques such as dynamic rule ordering. The method also goes beyond approaches which compile only the condition tests and action statements of rules because it also compiles and optimizes the inferencing mechanism.

There has thus been shown and described a novel method for producing a knowledge based system which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

What is claimed is:

1. A method of converting both a knowledge base and an inferencing technique into compilable program code forming a knowledge based system, said knowledge base including rules and data items, said rules being arranged in a network of nodes and links between such nodes, said nodes representing tests, logical operators, actions and data items, said network being in a form convenient for interpretive inferencing, said method comprising the steps of:

(a) partitioning said network into a plurality of sub-networks;

(b) labelling each node within each respective sub-network with a unique identifier;

(c) generating a segment of compilable, procedural, program code for inferencing which is equivalent to each respective sub-network when combined with said inferencing technique, said identifiers locating the respective code for each node within each respective sub-network, said inferencing code comprising a node sub-segment that implements the function of each node in said respective sub-network based on the rules specified in said knowledge base and that conditionally invokes other sub-segments using said identifiers, and a control sub-segment which provides access to each node sub-segment using said identifiers and provides for repeated execution of each node sub-segment as necessary; and (d) generating for each data item a segment of compilable procedural, program code for the distribution of such data item which invokes the appropriate program inferencing code by means of said identifiers when such data item is modified during execution of the knowledge based system.

2. The method defined in claim 1, further comprising the initial step of:

forming said network from said knowledge base.

3. The method defined in claim 1, wherein step (a) includes the step of selecting rule trees in said network as the respective sub-networks, with each rule tree's action, which is the root of the rule tree, becoming the start of the respective sub-network.

4. The method defined in claim 1, wherein step (a) includes the step of selecting nodes in said network as the respective sub-networks such that the references to nodes outside said sub-networks are minimized.

5. The method defined in claim 1, wherein step (b) includes the step of depth-first traversing each sub-network, starting at the end of such sub-network, and labelling each node in such sub-network sequentially.

6. The method defined in claim 5, wherein said nodes in each sub-network are labeled sequentially in consecutive order.

7. The method defined in claim 6, wherein said nodes of each sub-network are labeled sequentially in consecutive order starting with the number "1".

8. The method defined in claim 1, wherein step (c) includes the step of depth-first traversing each sub-network and generating a segment of compilable, procedural, program code for inferencing which is equivalent to such sub-network, said inferencing code comprising (1) a prologue consisting of initialization, while and case statements, (2) a case part for each node that implements the function of that node based on the rules specified in the knowledge base and conditional statements to reset the identifier to the next node to be evaluated, and (3) an epilogue comprising said control sub-segment.

9. The method defined in claim 8, wherein node sub-segments that are referenced by the program code for other sub-networks contain calls to the referencing rule procedures that pass the identifier for the reference point and any data associated therewith.

10. The method defined in claim 8, wherein node sub-segments contain calls to utility software to implement functions whose logic is not derived from said knowledge base.

11. The method defined in claim 1, wherein step (c) includes the step of generating a segment of inferencing code which includes calls to said distribution code for propagation of updated data items.

12. The method defined in claim 1, wherein step (d) includes the step of generating said distribution code consisting of a prologue sub-segment, a subsegment to call each rule procedure which references the data item, and an epilogue sub-segment.

13. The method defined in claim 12, wherein said call sub-segment passes the identifier for the test node to be executed by the inferencing code.

* * * * *